June 23, 1931. W. KIWULL 1,811,321
AIRCRAFT LANDING AND RELEASING APPARATUS
Filed Dec. 11, 1928 2 Sheets-Sheet 1

Inventor:
Woldemar Kiwull
Attorney.

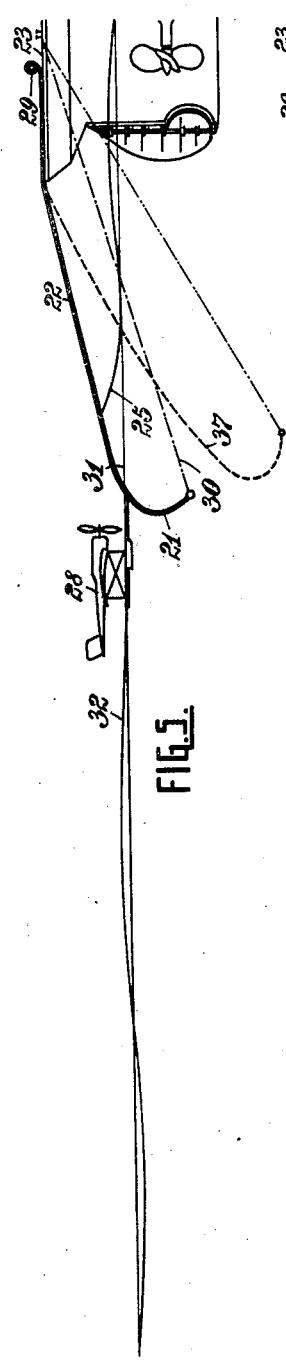
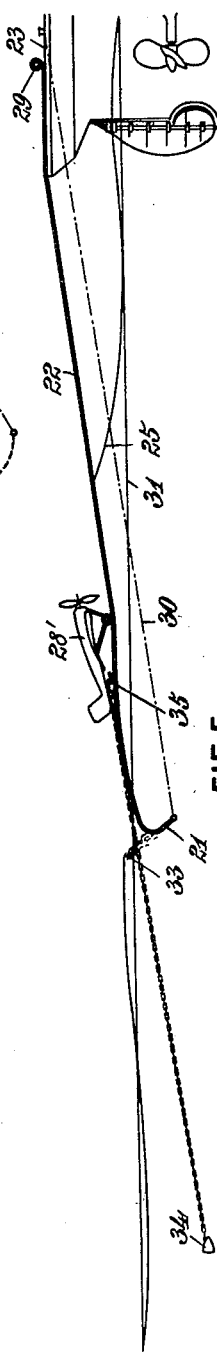
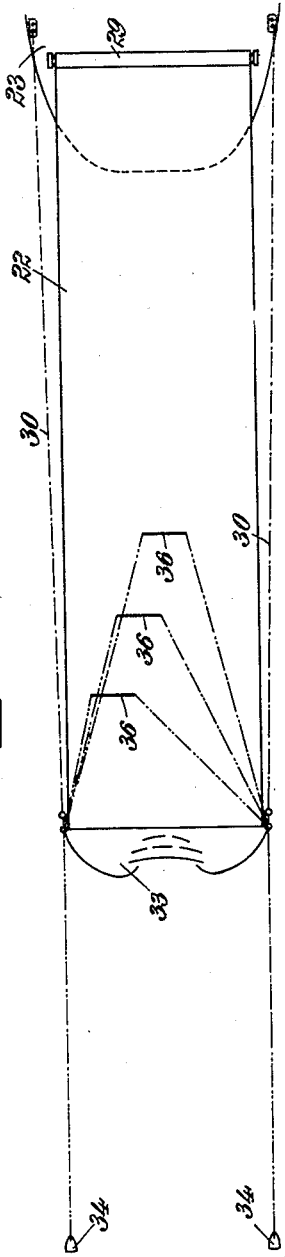

Patented June 23, 1931

1,811,321

UNITED STATES PATENT OFFICE

WOLDEMAR KIWULL, OF RIGA, LATVIA

AIRCRAFT LANDING AND RELEASING APPARATUS

Application filed December 11, 1928, Serial No. 325,308, and in Germany December 14, 1927.

The invention relates to a method and apparatus for taking up or releasing floating bodies, more particularly aircraft, onto platforms, e. g. ships or landing stages.

As it is known it is very difficult to take up floating bodies, in particular aircraft, from the water onto platforms, such as for instance the deck of a ship or a landing stage, and to deposit such bodies therefrom into the water. This is particularly true in the case of taking up aircraft at sea. Were it feasible to take aircraft on board without danger of destroying the same, irrespective of the state of the sea, then air traffic would be considerably more reliable. The invention affords a method of fulfilling this condition and consists in provoking an artificial swell or accumulation of water between the platform and the surface of the water the floating body being taken onto this accumulation of water from whence it can be transferred on board.

In the case of vessels the water accumulation or dammed wave is produced by trapping the flow from the screw, while with stationary landing stages it is provoked by damming a natural or artificial current of water.

The damming of water may be produced by a resistance body arranged in streaming water, e. g. a sail which is suspended from the platform or the like. The resistance body may further be combined with a web that leads to the platform. In this case a damming of the water is produced below the web and a depression of the water level and a back flow behind the web, whereby the taking up of seaplanes is considerably facilitated. Besides, this arrangement affords the possibility of also taking on board land aircraft.

Figure 2:
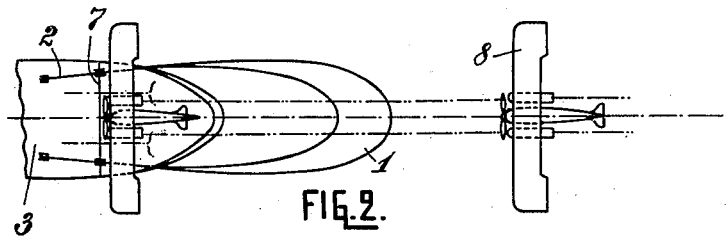
Figure 3:
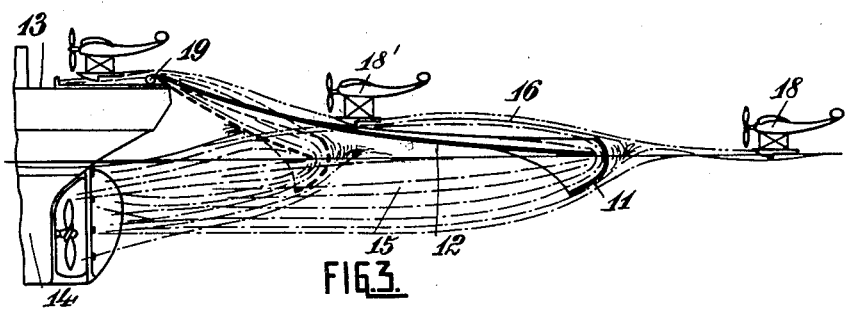
Figure 4:
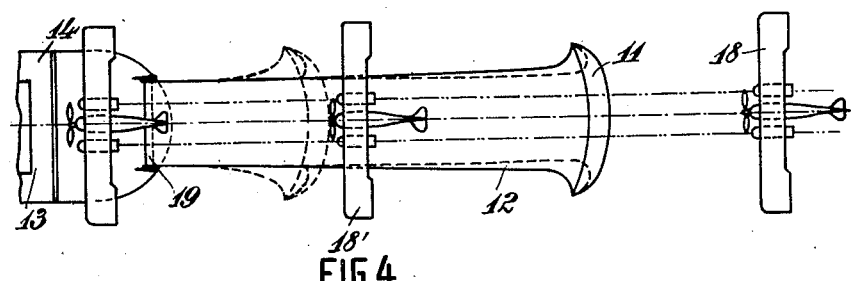

In order to allow the invention to be more easily understood, two preferred embodiments of the apparatus intended to take up aircraft on ships and to release deposit it therefrom are illustrated by way of example in the drawings which accompany and form part of this specification. In these drawings Figure 1 is a sectional elevation of an apparatus intended to be used on a vessel having a low stern and high speed, Figure 2 is the corresponding plan view, Figure 3 is a view similar to that of Figure 1 of an embodiment of the invention applied to a vessel having a high stern but slow speed, Figure 4 is the corresponding plan view, Figure 5 is a sectional elevation of another embodiment of the invention and shows the means for producing the accumulation of water under a web and a depression of the water level behind it, a seaplane being taken on board, Figure 6 is a view similar to Figure 5, in which the web is extended in order to take up a land plane, Figure 7 is a plane view corresponding to Figures 5 and 6.

Figure 1:
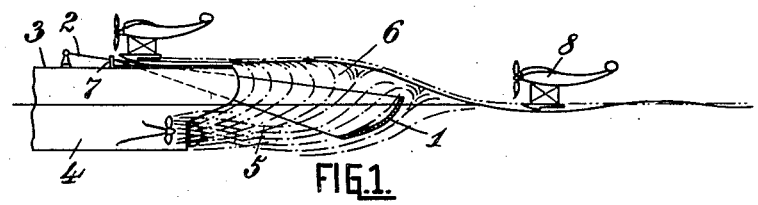

Referring first to Figure 1, the above-mentioned resistance body is formed by a sail 1 which is secured to the deck 3 of the vessel 4 by two ropes 2 and held thereby in an under water position across the stream 5 from the screw of the vessel. Due to the resistance of the sail 1 to the said stream the speed imparted to the water by the screw is converted into a damming effect and the direction of flow of the water thereby altered. Hence a swell or accumulation 6 of water is formed which flows off over the sail 1 partly down and partly in upward and lateral directions. In order to prevent the deck from being flooded beyond a certain limit, a transverse bulwark 7 is provided.

If a seaplane should be taken in board the vessel is steered on a course against the wind. The seaplane 8 then descends within range of the wake at the stern of the vessel which wake is not materially influenced by rough water and breaking waves and runs on to the accumulation of water 6 from where it can be conveyed onto the deck entirely unaffected by the pitching and rolling motions of the vessel, and deposited thereon.

If the deck is very high and the speed of the vessel comparatively slow, as for example in cargo or passenger vessels, the resistance body is fixed on a web made of fabric and extending from the deck of the vessel, which web carries the resistance body in the stream produced by the screw. With this arrangement it is possible by varying the position of said body relatively to the vessel and to the surface of the water, to produce a higher or lower damming or depression of the water. In either case the airplane can be tugged unaffected by external influences.

As illustrated in Figures 3 and 4, the resistance body 11 is attached to the web 12 secured to the deck 13 of the vessel 14. The body 11 forms in the stream 15 from the screw an accumulation 16 of water which is comparatively flat so that the airplane 18 that has descended in the wake of the vessel may run conveniently on to said accumulation. The web 12 is kept tightly stretched by the water pressure acting upon the resistance body 11 and is held rigidly in the direction of the course of the vessel. When arched downwardly the web forms a trough for the back flow of the dammed water 16. This back flow will maintain the airplane in the position denoted by 18' in which it is completely unaffected by the pitching and rolling motions of the vessel. By means of a gear 19 the web 12 may be eased off or drawn in or on board the vessel. In this manner or by varying the speed of the vessel the height of the water accumulation or the nature of the back flow can be modified as desired.

The web 12 forms a convenient access to the deck of the vessel so that members of the crew and passengers may pass from the aircraft to the deck and inversely. With the aircraft in this position, it may be provided with supplies such as fuel and provisions, and besides, simple repairs and inspections may be carried out.

The aircraft can be taken on board the vessel by drawing in the web 12. The speed of the current acting against the body 11 is increased by the speed at which the web 12 is drawn in. Consequently the level of the accumulation will rise while at the same time the angle of inclination of web 12 will be increased. This is illustrated by dotted lines in Figures 3 and 4. The aircraft is conveyed on board the vessel from the position 18' and is deposited there. When starting or releasing the aircraft, the procedure will be reversed.

The resistance body may be combined with the web directly, this being suitably made by bending the web at its outer end and securing it by ropes fixed on board the vessel. An arrangement of this type is illustrated in Figures 5 to 7. The web is here denoted by 22, the ropes by 30.

Due to the action of the stream from the screw on accumulation of water indicated by the line 25 is produced under the web 22. With the web and resistance body in the positions shown in Figure 5, the water level 31 behind the body 21 will be depressed slightly and a back flow 32 is provoked which is quite gentle and uninfluenced by water movements caused by a rough sea and by the vessel and thus enables the seaplane 28 to alight safely. Furthermore, this back flow carries the seaplane safely on to the web 22 even if it has alighted on the water at an angle to the longitudinal axis of the web.

If a land plane 28' is to be taken on board, then the web 22 is preferably let out further, see Figure 6, in order to reduce the inclination of the web. Furthermore the position of the resistance body 21 is modified in such a fashion that the wave 25 under the web extends to a greater length than illustrated in Figure 5. With this arrangement of the web a sog wave 33 is formed behind the body 21 which may serve as a steering mark for the land plane. The latter alights on the water accumulation and is elastically received thereby. Its end run is braked by the inclination of the web 22. Further braking of the plane may be produced if necessary by two logs 34 which run over sheaves at the end of the web. The skid of the plane catches in the rope connecting the two logs and draws the latter along with it, whereby the plane is braked and at the same time guided towards the middle of the web 22. This effect is illustrated by dot and dash line 36 in Fig. 7.

As a rule it will be sufficient to bring the machine, whether land plane or seaplane, to a standstill within the lower half of the web 22. The web need not necessarily reach on to the deck 23, it may for example terminate in the range of the accumulation of water 25, provided that this length of web is sufficient for the alighting and arresting of the plane.

When it is desired to take a seaplane on deck, it may be drawn on board by means of the normal hauling gear over the web 22. A land plane may be taken on board in a similar manner or may run onto the deck over the web under its own power.

If a seaplane is to be set in the water, it is let down onto the web and the inclination of the latter altered by letting out the two ropes 30 or by reducing speed or reducing the stream from the screw, until the web lowers and the plane begins to float within the limits of the screw stream protected from the motions of the sea. The altered position of the web is indicated by dotted lines 37 in Figure 5.

If a land plane is to be started, the deck 23 serves for the taking off run and the web 22 prevents dropping of the machine while starting.

The inclination and position of the resistance body or bodies relatively to the web and to the flow may be controlled by altering the ropes. In this manner it is possible to suit the tensional forces acting upon the web to the desired conditions. At the same time alteration of the inclination of the web may be effected. Independently of the resistance body the inclination of the web may also be modified by letting out or drawing in the web.

The web or a part thereof may be in the form of a travelling band in order to move the plane, after having alighted on the web, on and from the vessel. To this end further special conveying devices may be provided, e. g. a portable frame, slide members, as skis, mats and the like, or a system of rollers built in the web or independent thereof or arranged on the airplane itself, and so on.

The arrangement according to the invention materially brakes the pitching motions of the stern of the vessel in the sea and thus enables safe landing or taking on board of aircraft.

Furthermore the arrangement may be used as emergency rudder and serve to take shipwrecked persons on board.

The method described may be employed even in a harbour with a vessel lying at anchor for the purpose of taking up or setting down floating bodies. In this case the flow from the screw is more or less held up by a resistance body held under water transversely to said flow so that the entire horsepower of the vessel is used for the raising and lowering of the floating body.

The taking up of airplanes and boats on to landing stages and their letting down or release therefrom is performed in a similar manner by producing an accumulation of water by means of a resistance body secured to the landing stage.

I claim as my invention:

1. The method of taking up floating bodies, more particularly aircraft, onto platforms, e. g. vessels or landing stages, consisting in mechanically producing a swell of water between the platform and the water surface and transferring said floating body onto said platform over said swell of water.

2. In combination a platform projecting beyond a water surface, means for producing a stream in the water in the vicinity of said platform, a baffle body suspended from said platform and lying in the water stream and adapted to dam up the water supplied to it by said stream.

3. In combination a platform projecting beyond a water surface, means for producing a stream in the water from said platform, a baffle body suspended from said platform and lying in the water stream and adapted to dam up the water supplied to it by said stream.

4. In combination a platform projecting beyond a water surface, means for producing a stream in the water from said platform, a baffle body suspended from said platform and lying in the water stream and adapted to dam up the water supplied to it by said stream, and means for altering the position of said baffle body relatively to said platform.

5. In combination a platform projecting beyond a water surface, means for producing a stream in the water from said platform, a baffle body suspended from said platform and lying in the water stream and adapted to dam up the water supplied to it by said stream, a web fixed on said baffle body and said platform, and means for altering the position of said baffle body relatively to said platform.

6. In combination a platform projecting beyond a water surface, means for producing a stream in the water from said platform, a baffle body suspended from said platform and lying in the water stream and adapted to dam up the water supplied to it by said stream, a web fixed on said baffle body and said platform above said water accumulation, and means for altering the position of said baffle body relatively to said platform and to said web.

7. In combination a platform projecting beyond a water surface, means for producing a stream in the water from said platform, a baffle body suspended from said platform and lying in the water stream and adapted to dam up the water supplied to it by said stream, a web fixed on said baffle body and said platform, and means for altering the position of said baffle body relatively to said platform and to said web.

8. In combination a platform projecting beyond a water surface, means for producing a stream in the water from said platform, a baffle body suspended from said platform and lying in the water stream and adapted to dam up the water supplied to it by said stream, a web fixed on said baffle body and said platform, means for altering the position of said baffle body relatively to said platform and to said web, and means in connection with said web for braking airplanes alighting thereon.

9. In combination a platform projecting beyond a water surface, means for producing a stream in the water from said platform, a baffle body suspended from said platform and lying in the water stream and adapted to dam up the water supplied to it by said stream, a web fixed on said baffle body and said platform, means for altering the position of said baffle body relatively to said platform and to said web, and further baffle bodies in the water suspended from said web and adapted to be moved in baffling direction by an airplane alighting on said web.

10. In combination a platform projecting beyond a water surface, means for producing a stream in the water from said platform, a baffle body suspended from said platform and lying in the water stream and adapted to dam up the water supplied to it by said stream, a web fixed on said baffle body and said platform, means for altering the position of said baffle body relatively to said platform and to said web, further baffle bodies in the water suspended from said web and adapted to be moved in baffling direction by an airplane alighting on said web, and means in connection with said web for conveying airplanes thereon.

11. A method of taking up and releasing floating bodies particularly aircraft onto ships which comprises mechanically forming a swell of water against the ship so that the aircraft can ride onto and from the ship on said swell.

12. A method of taking up and releasing floating bodies, particularly aircraft, onto ships which comprises releasing a platform into the water from the ship and causing a water swell to be formed at the water end of the platform, and moving the aircraft over the end of the platform on the water swell onto the platform.

13. A method of taking up and releasing floating bodies, particularly aircraft, onto ships which comprises releasing a platform into the water from the ship and causing a water swell to be formed at the water end of the platform, moving the aircraft over the end of the platform on the water swell onto the platform, and hauling the aircraft up the platform and onto the ship.

14. A method of taking up and releasing floating bodies, particularly aircraft, onto ships which comprises releasing a web from a ship and causing an accumulation of water under the web and a back flow of water at the end of the web whereby the aircraft can ride from the back flow onto the web.

15. A device for taking up and releasing floating bodies, particularly aircraft, onto and from ships comprising a platform extending from the ship into the water, and means on the end of the platform for causing an accumulation of water on which the aircraft floats onto the ship.

16. A device for taking up and releasing floating bodies, particularly aircraft, onto and from ships comprising a platform extending from the ship into the water, and a resistance body on the end of said platform for causing an accumulation of water on the platform on which the aircraft floats onto the platform.

17. A device for taking up and releasing floating bodies, particularly aircraft, onto and from ships comprising means for forming a swell of water adjacent the ship on which the aircraft floats onto and from the ship.

18. A device for taking up and releasing floating bodies, particularly aircraft, onto and from ships comprising means for forming a swell of water adjacent the ship on which the aircraft floats, and a platform on which the aircraft moves from the swell onto the ship.

19. The method of raising floating objects onto a platform from a body of water, the platform and the water having relative velocity, comprising producing a swell at the rear of said platform which raises the water to a higher level, for the said objects to float on toward said platform.

20. The method of raising floating objects onto a platform from a body of water, the platform and the water having relative velocity, comprising producing a swell at the rear of said platform which raises the water to a higher level, and spreading on the surface of the raised water a layer of solid material for the said objects to move on toward said platform.

In testimony whereof I affix my signature.
WOLD. KIWULL.